Figure 1:
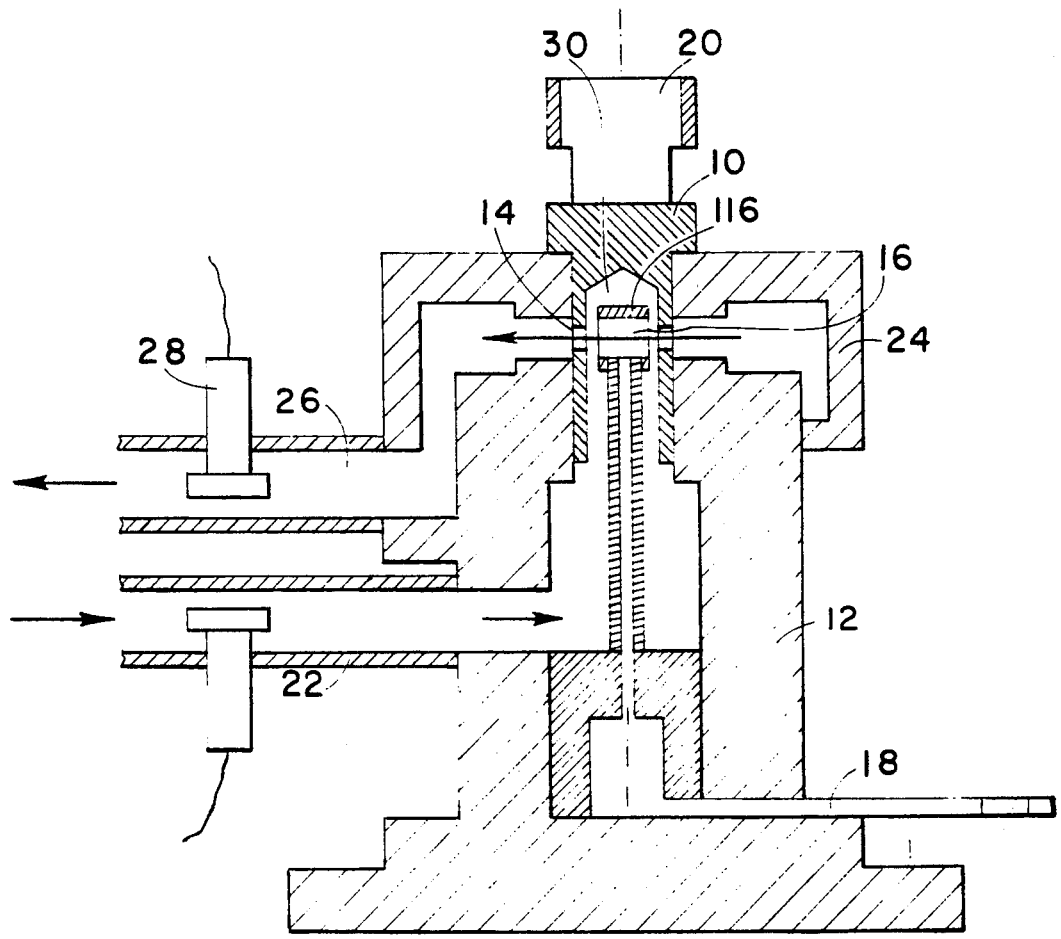

United States Patent [19]

Frembgen

[11] Patent Number: 5,225,053
[45] Date of Patent: Jul. 6, 1993

[54] METHOD FOR REGULATING THE ELECTRICAL CURRENT IN AN ELECTROCHEMICAL WORKING PROCESS

[76] Inventor: Fritz-Herbert Frembgen, Erfurter Str. 31, 8940 Memmingen, Fed. Rep. of Germany

[21] Appl. No.: 809,273

[22] Filed: Dec. 16, 1991

[30] Foreign Application Priority Data

Nov. 25, 1991 [DE] Fed. Rep. of Germany ....... 4040590

[51] Int. Cl.⁵ ............................ B23H 3/02; B23H 9/02
[52] U.S. Cl. ........................... 204/129.2; 204/129.25; 204/129.43; 204/129.5; 204/129.7
[58] Field of Search ................ 204/129.25, 129.43, 204/129.5, 129.2, 129.7

[56] References Cited

U.S. PATENT DOCUMENTS

| | | | |
|---|---|---|---|
| 3,630,877 | 12/1971 | Koike et al. | 204/129.25 X |
| 3,714,005 | 1/1973 | Drushel | 204/129.2 |
| 4,125,444 | 11/1978 | Inoue | 204/129.43 |
| 4,264,417 | 4/1981 | Vasiliev et al. | 204/129.5 X |
| 4,475,995 | 10/1984 | Ziegler et al. | 204/129.5 X |
| 4,659,894 | 4/1987 | Inoue | 204/129.43 X |

*Primary Examiner*—Donald R. Valentine
*Attorney, Agent, or Firm*—Notaro & Michalos

[57] ABSTRACT

While in electrochemical working of workpieces presently largely the constant current regulation at the working gap between workpiece and tool is being utilized, the new method includes increasingly raising the operating current at the working gap during the working process with increasing widening of the working gap due to the removal of material.

10 Claims, 3 Drawing Sheets

METHOD FOR REGULATING THE ELECTRICAL CURRENT IN AN ELECTROCHEMICAL WORKING PROCESS

The invention relates to a method for regulating the electrical current in an electrochemical working process in which between tool and workpiece a working gap is formed through which flows an electrolyte solution and the workpiece is connected as anode and the tool as cathode to a variable dc current source thereby that the gap voltage is increasingly raised as a function of the size of the working gap which increases during the working.

From DE 37 09 433A1 is known a method of such type in which the voltage at the working gap is varied as a function of the increasing size of the working gap in such a way that a constant operating current results at the working gap (constant current regulation).

According to DE 16 15 098 during the working cycle the number of coulombs necessary for the removal of a given quantity of metal is measured and compared with a settable nominal value. As soon as the actual value reaches the nominal value, the working current is switched off. The method operates with a constant supply voltage (constant voltage regulation). With increasing size of the working gap the operating current therefore decreases. The working time is therefore longer than is the case with the constant current regulation principle described first. Since the quantity of material removed per unit time is directly proportional to the magnitude of the operating current, it is reasonable to work with high current magnitude at low voltage. For deburring a current magnitude of 0.5 A/1 mm edge length has proven to be a good reference value. Since with constant current regulation the gap voltage between workpiece and tool increases approximately linearly with increasing gap width, the power accordingly also increases linearly, which the electrolyte solution must carry off. The temperature of the electrolyte solution increases correspondingly between inflow and outflow in the working arrangement and must be recooled. If it is assumed that with increasing gap width the throughflow of the electrolyte solution increases correspondly, it can be supposed that the power, increasing linearly during the working process, in the case of a constant current regulation can be accepted by the volume current also increasing approximately linearly so that the temperature of the electrolyte solution on exiting from the arrangement remains approximately constant.

It is the task of the invention to create a regulation method in order to accelerate the electrochemical working of workpieces without having to accept an impermissible temperature increase of the electrolyte solution.

This task is solved in a method of the type stated in the introduction thereby that the quantity of the gap electricity per unit time is continuously increased as a function of a physical parameter varying with increasing width of the working gap or is continuously increased over the length of the working process as a function of a physical parameter measured at intervals.

While it has previously been known to work with a gradual decrease of the current density (constant voltage regulation) and also to use a constant current regulation, the invention suggests a regulation method according to which the quantity of electricity per unit time is continuously increased with increasing size of the working gap. It is clearly evident that thereby overall a greater quantity of electricity can be utilized for any given working time whereby the length of the working process is decreased. Since according to the method according to the invention with increasing working gap the voltage as well as also the current increase, the power transferred to the electrolyte solution increases progressively, which actually should have lead to a gradually increasing outflow temperature of the electrolyte solution. Surprisingly, this is not the case, however.

The method permits a particularly simple possibility of regulating the current magnitudes. Alternatives are also provided. The electrolyte in any case must not partially vaporize. If for example the temperature of the electrolyte is measured continuously at the outlet of the working arrangement, the operating voltage can be increasingly raised to the extent that the outflow temperature remains constant. Somewhat more expensive is a regulation of the current density as a function of the pressure drop of the electrolyte during passage through the working gap as well as a throughput measurement of the electrolyte. However, these two types of regulation, could, in principle, also be applied. A further alternative of current regulation is also provides.

Regardless of which physical parameter is measured and drawn on for the regulation of the quantity of electricity, a greater voltage increase at the working gap takes place than is required for achieving a constant gap current.

An increase of the quantity of electricity not only can be realized through an increase of the current magnitude but rather also through an increase in pulse DC current. The present invention also offers the advantage that tool damages are avoided and improper insertion of the workpiece is discovered as well as burrs of too great a size which could not be eliminated in the normal deburring time. With the method according to the present invention, an approximation to the optimal course of the quantity of electricity over the length of the working time is possible; and the method permits the recognition and avoidance of damages to the tool and workpiece in connection with a nominal value storage.

Figure 2:
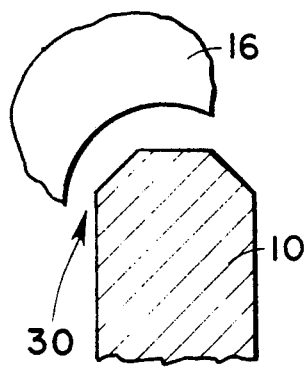
Figure 3:
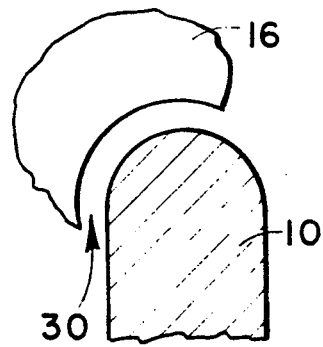
Figure 4:
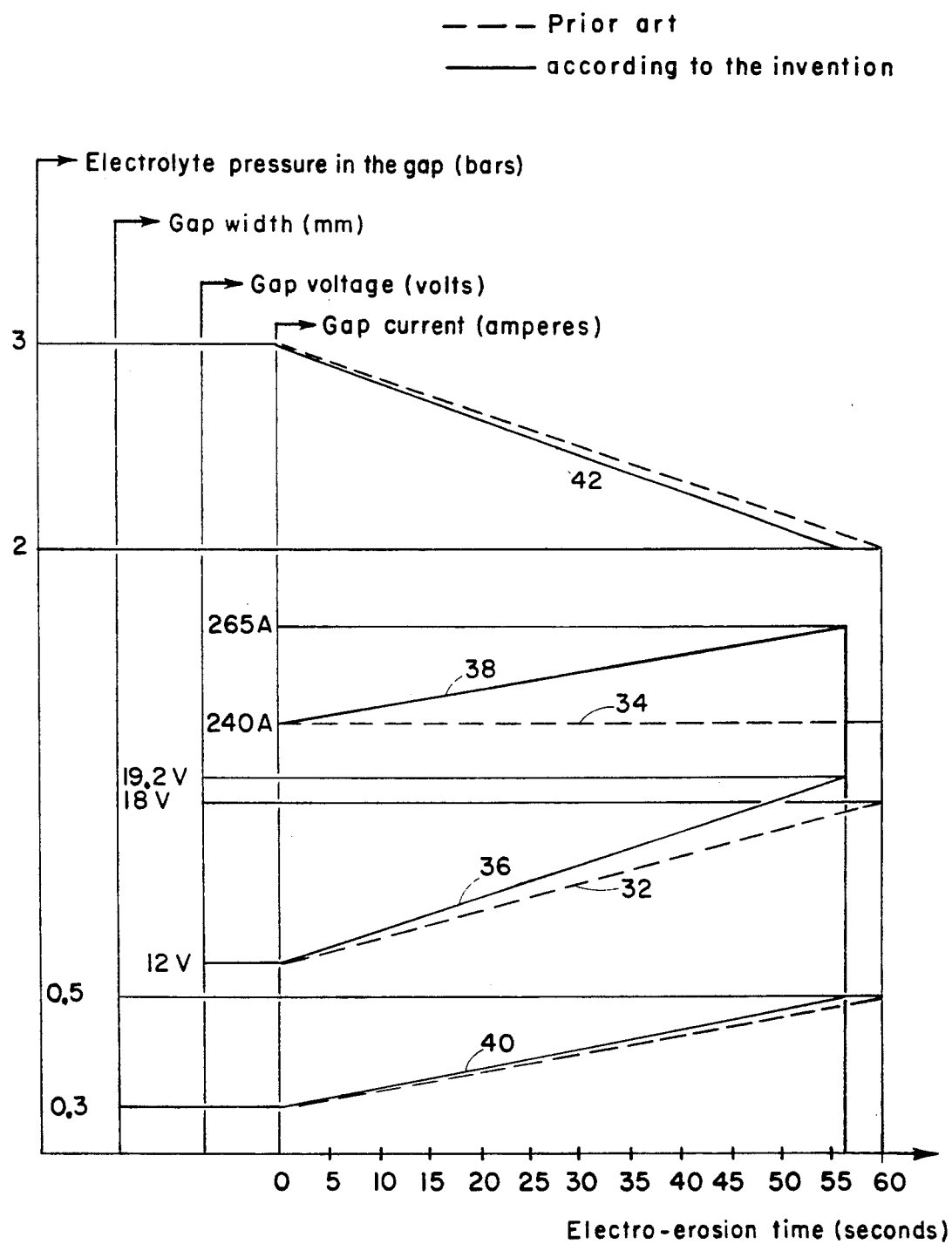
Figure 5:
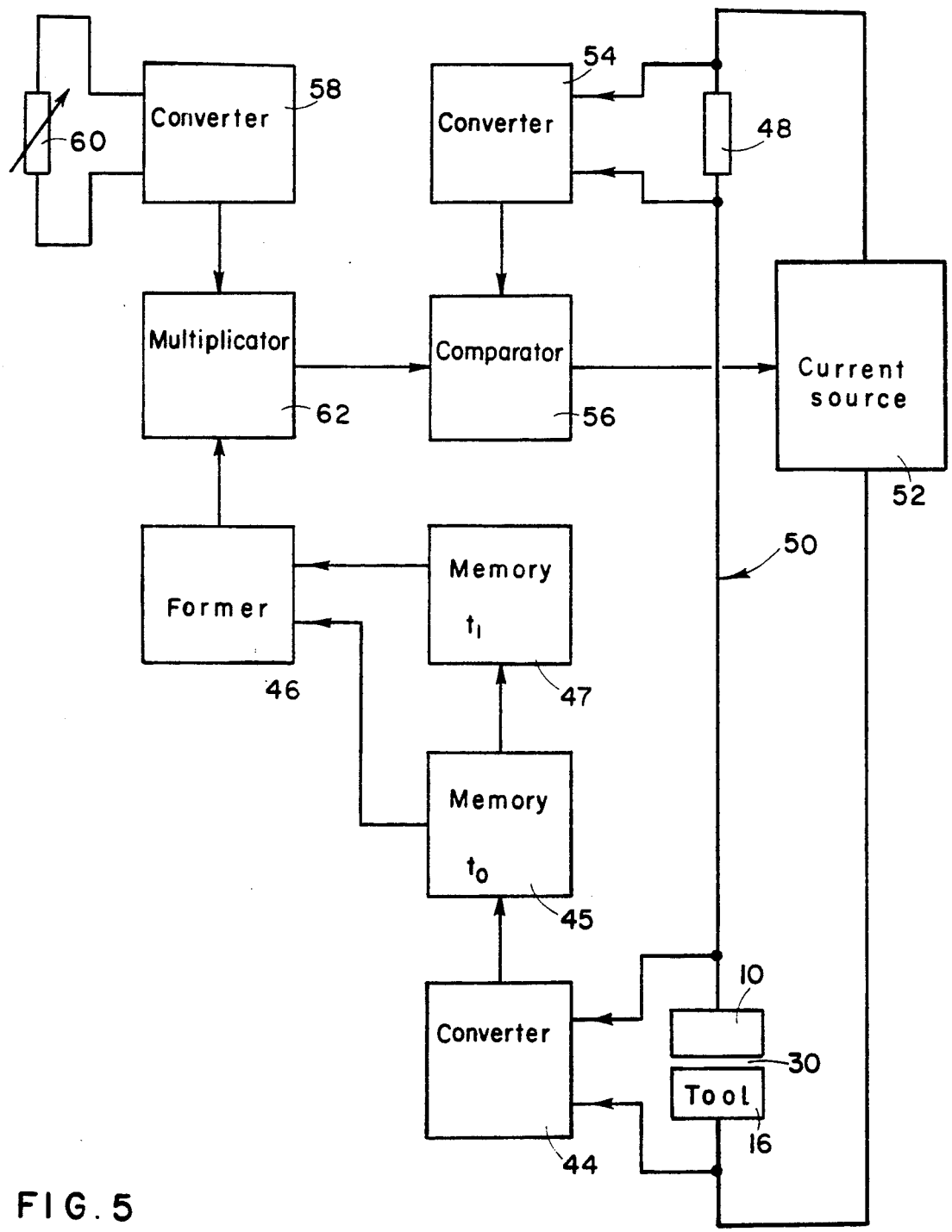

The invention will be described in further detail in conjuction with the drawings. Which show that:

FIG. 1 is sectional view of an arrangement for the electrochemical deburring of a workpiece, FIG. 2 is a sectional view with representation of the working gap between tool and workpiece at the beginning of the electrochemical rounding-off process, FIG. 3 is sectional representation similar to FIG. 2, however, after completed working of the workpiece, FIG. 4 is diagram with representation of some parameters varying during the working process of the electrolyte, the working gap and the electrical value according to the invention as well as also according to prior art, and FIG. 5 is block circuit diagram for elucidating the regulation method according to the invention.

The arrangement shown in FIG. 1 serves for deburring of a workpiece 10, which is placed into a workpiece holder 12 from above and which has a transverse bore 14 which is to be deburred from the inside. Into the interior of the workpiece 10 projects the tool 16 which is equipped with a ring electrode 116 adjacent to the transverse bore 14. The tool 16 is provided with a current supply terminal 18 and connected as cathode to a dc current source 52, shown schematically in FIG. 5. Onto the workpiece 10 is placed a spring anode contact 20 which is also connected to the dc current source 52. Electrolyte fluid flows through an inlet line 22 into the interior of the workpiece holder 12, through the working gap 30 between the ring electrode of the tool 116 and the workpiece 10, and exits through the transverse bores 14 in the workpiece 10 into an outlet channel 26 formed between a can 24 serving as splash guard and the workpiece holder 12. In the outlet channel 26 is disposed a sensor 28 which measures a physical parameter of the electrolyte solution.

FIGS. 2 and 3 show in simplified form the working gap 30 formed between tool 16 and workpiece 10. The tool 16 serves here for rounding off the edges of the workpiece: FIG. 2 shows the shape of the workpiece and the working gap 30 at the beginning of the removal process. FIG. 3 shows the conditions at the end of the working process. Since the working gap 30 widens from for example 0.3 mm to approximately 0.5 mm, the physical values of the electrolyte also change at the sensor 28 which can be implemented for example as a temperature sensor, a pressure sensor or as a sensor for the quantity of throughflow.

If it is assumed that the sensor 28 is a temperature sensor, it would experience a temperature drop at constant energy absorption of the electrolyte in the working gap 30 due to the current flowing between the electrodes if the inlet temperature given by the cooler (not depicted) is constant. This rests on the critical reduction of the throttle effect during the gap widening. In the case of constant current regulation, the voltage between the electrodes at the working gap 30 increases so that the quantity of heat which must be carried off by the electrolyte increases accordingly. Nevertheless, the influence of the increase of the throughflow quantity due to the widening of the gap predominates so that overall a temperature drop is still measured at sensor 28. If the voltage at the working gap 30 is continuously raised slightly above the values applicable for a current constancy, the magnitude of the current also increases with the gap widening and this additional voltage increase can be regulated very simply as a function of the outflow temperature of the electrolyte in such a way that this outflow temperature remains constant or varies with the working time along a nominal curve. It is therein essential that the current magnitude is increased continuously or in small steps during the working time so that the total quantity of electricity necessary for the removal process is effective in shorter time between the electrodes than would be the case in a constant current regulation. Thereby the working time is reduced.

It is understood that instead of the temperature sensor also a throughflow meter can be used in the electrolyte line circuit. This sensor does not necessarily need to be provided in the outlet channel 26 of the arrangement. Since the pressure drop decreases with increasing width of the working gap 30, the throughflow quantity increases and this value is utilized for regulating the voltage increase at the working gap 30 in order to increase the magnitude of the current. Since the throttle effect in the working gap 30 can also be measured as pressure drop, accordingly two pressure sensors can also be used at the outlet and the inlet of the arrangement in order to obtain the desired regulation parameter.

Lastly, it is also understood that the distance of the two electrodes can also be measured inductively or also capacitively in known manner so that via these measured values the gap widening can be determined directly and can be introduced into the voltage regulation as measured value.

The simplest solution for the continuous increase of the current between the two electrodes at the working gap 30 however, takes place as a function of a continuously measured working voltage obtaining between these electrodes. If, for example according to FIG. 4 at the beginning of the working process the voltage at the working gap is 12 V and a current of 240 A flows a continuous voltage increase is required in order to keep this current constant at 240 A. The voltage trace 32 in FIG. 4 shows that after a working time of 60 seconds the voltage has reached a value of 18 V. The associated current magnitude progresses along the horizontal line 34 and continues to be 240 A. But since in practically all cases of electrochemical working due to the gap widening an increase of the quantity of electricity of at least 10 percent is permissible, the actual operating voltage continuously experiences a corresponding increase. The actual trace of the operating voltage is represented by curve 36 which here for the sake of simplicity is depicted linearly, which, however, is not absolutely necessary, since a progressive or a degressive course is also possible. During the working cycle a continuous increase of the current strength is achieved in this voltage course. This current magnitude is represented by curve 38 which, relative to the straight line 34 for the constant current regulation, increases. Since the voltage at the end of the working cycle is higher by 10 percent with respect to the beginning voltage than the end voltage in the constant current method, namely 19.8 V instead of 18 V, the current magnitude also has increased by 10 percent, namely from 240 A to approximately 265 A. The average current increase accordingly is 5 percent in the embodiment example and the working time, which is now only 57 seconds instead of 60 seconds, is reduced by this value.

As is evident from the left two ordinates of FIG. 4, the working gap has widened from 0.3 mm to 0.5 mm (curve 40) and the pressure of the electrolyte before and behind the gap is reduced from 3 bars to 2 bars (curve 42 in FIG. 4).

FIG. 5 elucidates the block circuit diagram of the regulating device for the continuous increase of the current magnitude during the working process as a function of the measurement of the voltage at the working gap 30 between the tool 10 and the workpiece 16. The voltage measured there is digitized in an analog-to-digital converter 44. The measured values at time $t_0$ and at time $t_1$ are kept temporarily in memories 45, 47 and supplied to a difference former 46. As is the case in the conventional constant current regulation method, the voltage drop at a dropping resistor 48 is measured in the operating circuit 50 of a variable current source 52 and digitized in an analog-to-digital converter 54. The digitized values of the voltage drop are compared with corresponding given values in a comparator 56 whose output drives the current source 52 in order to increase continuously in this way in the known method the voltage of this current source so that in the widening working gap 30 the current remains constant. According to the invention, the signals obtained from the difference formers 46 are supplied together with digital values generated from a further analog-to-digital converter 58 which are settable via a potentiometer 60 to a multiplicator 62 which calculates the selected increase of the measured gap voltage value. The output of the multiplicator 62 leads to comparator 56 so that the current source 52 receives a control signal which leads to a higher output voltage than would be required for a current constancy between the electrodes 10 and 16.

The continuous or interval measurement of the physical parameter can be used according to the invention to terminate the working process, namely if the actual value has reached the nominal value without the quantity of the gap electricity being increased continuously. In particular, the gap voltage can simply be increased continuously or in fine steps in such a way that the gap current remains constant. In that case the nominal end voltage can be used as given value in order to terminate the working process if the actual value has reached the nominal end value. This approach has the advantage that the length of the working process is not controlled in time but rather by the deburring i.e. the working state of the workpiece.

It is understood, that this method variant can also be used in connection with the subject matter of the method according to the invention.

I claim:

1. A method for controlling an electrical current from a direct current source of an electrochemical working machine having a tool and a workpiece, the method comprising:
    spacing the workpiece away from the tool and forming a working gap therebetween;
    connecting an anode of the direct current source to the workpiece;
    connecting a cathode of the direct current source to the tool;
    providing the electrical current from the direct current source to the working gap through the anode and the cathode for achieving a gap voltage:
    flowing electrolyte solution through the working gap between the workpiece and the tool for performing a working process on the workpiece thereby increasing the spacing of the working gap;
    measuring a physical parameter of the working gap; and
    continuously increasing the electrical current to the working gap as a function of the physical parameter measured such that the gap voltage is continuously increased as the spacing of the working gap is increased.

2. The method according to claim 1 wherein the density of the electrical current after performing the working process is greater than the initial density of the electrical current.

3. The method according to claim 2, wherein the physical parameter measures includes gap voltage, gap resistance, gap width, electrolyte pressure, electrolyte temperature and throughflow of the electrolyte.

4. The method according to claim 3, wherein the gap voltage increases at least 10%.

5. The method according to claim 3, wherein the direct current source is a pulsed direct current and the current is increased by increasing the number of pulses per unit of time.

6. The method according to claim 3, wherein the working process of the electrochemical working machine is terminated at predetermined time values.

7. The method according to claim 3, wherein the machine is provided with a nominal value for a parameter such that the working process of the electrochemical working machine is terminated when the measured parameter equals the nominal value.

8. The method according to claim 7, wherein the parameter is the gap voltage.

9. The method according to claim 3, wherein the parameter is measured continuously.

10. The method according to claim 3, wherein the parameter is measured at intervals.

* * * * *